(12) United States Patent
Puett III et al.

(10) Patent No.: US 6,913,233 B2
(45) Date of Patent: Jul. 5, 2005

(54) SHAFT MOUNTABLE PENNANT STRUCTURES

(76) Inventors: Ralph Thomas Puett III, 2975 McDonald La., Corona, CA (US) 92881; Ralph Thomas Puett IV, 2975 McDonald La., Corona, CA (US) 92881

( * ) Notice: Subject to any disclaimer, the term of this patent is extended or adjusted under 35 U.S.C. 154(b) by 0 days.

(21) Appl. No.: 10/691,631

(22) Filed: Oct. 23, 2003

(65) Prior Publication Data

US 2005/0087658 A1 Apr. 28, 2005

(51) Int. Cl.$^7$ ............................................. E04G 3/00
(52) U.S. Cl. ................... 248/229.1; 40/591; 116/28 R; 116/173; 248/230.7; 248/539
(58) Field of Search .................. 248/229.1, 229.16, 248/229.2, 229.26, 230.1, 231.81, 316.7, 539, 219.4, 56, 534; 40/591, 617, 658; 116/173, 174, 28 R

(56) References Cited

U.S. PATENT DOCUMENTS

| | | |
|---|---|---|
| D60,773 S | 4/1922 | Carter |
| 4,292,749 A * | 10/1981 | Thomas ........................ 40/308 |
| D264,571 S | 5/1982 | Ornatek |
| 4,787,161 A | 11/1988 | Feng |
| 4,984,379 A | 1/1991 | Lee |
| 4,989,820 A * | 2/1991 | Sterling ........................ 248/523 |
| 5,288,047 A * | 2/1994 | Pan ........................ 248/229.26 |
| D407,346 S | 3/1999 | Wyatt et al. |
| 5,904,116 A | 5/1999 | Wyner et al. |
| 5,957,155 A * | 9/1999 | Lovejoy ........................ 137/356 |
| 6,278,061 B1 * | 8/2001 | Daoud ........................ 174/65 R |
| 6,371,043 B1 | 4/2002 | Pearison |
| D488,090 S | 4/2004 | Hester |
| 2003/0000044 A1 * | 1/2003 | Hawkins ........................ 16/221 |
| 2003/0192467 A1 * | 10/2003 | Paris ........................ 116/173 |
| 2003/0200683 A1 | 10/2003 | Gailen |
| 2004/0031433 A1 * | 2/2004 | Cardarelli ........................ 116/174 |

* cited by examiner

Primary Examiner—Ramon O Ramirez

(57) ABSTRACT

A pennant holder for attaching a pennant to a small pole, comprising: a pole holder made out of a plastic material in the shape of a cylinder having a closed end, the closed end being slit to form flaps that permit the pole to pass through the closed end of the cylinder while displacing the flaps and causing the flaps to grasp and hold the pole, the pole holder having an integral receiving U-shaped clip; and a pennant attachment having two mating halves that grasp the attachment end of the pennant and hold it along the length of the attached end, the pennant attachment adapted to fit into the receiving clip in the pole holder.

13 Claims, 3 Drawing Sheets

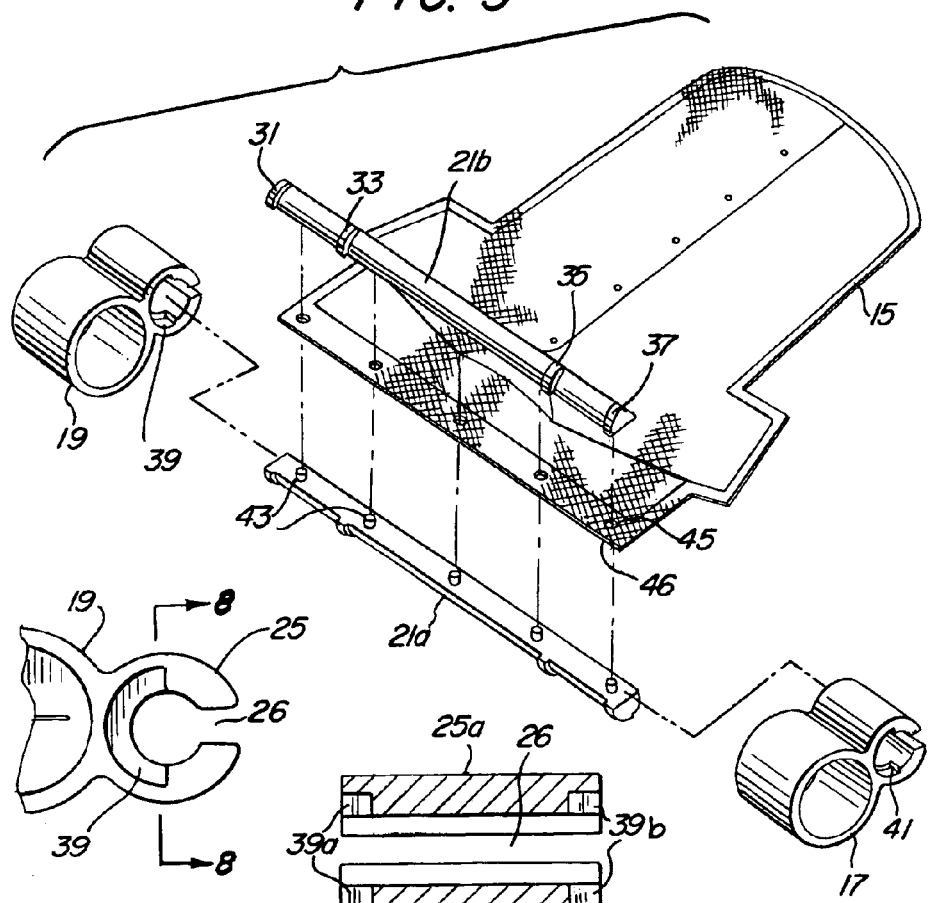
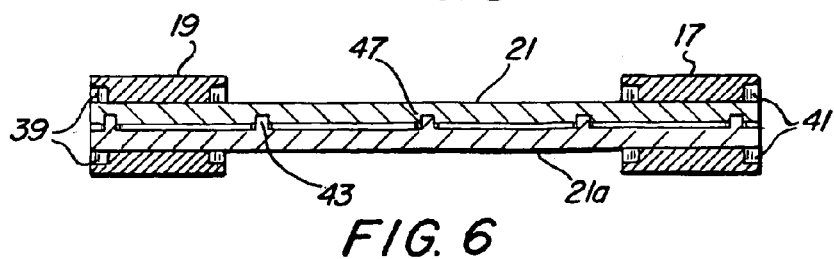

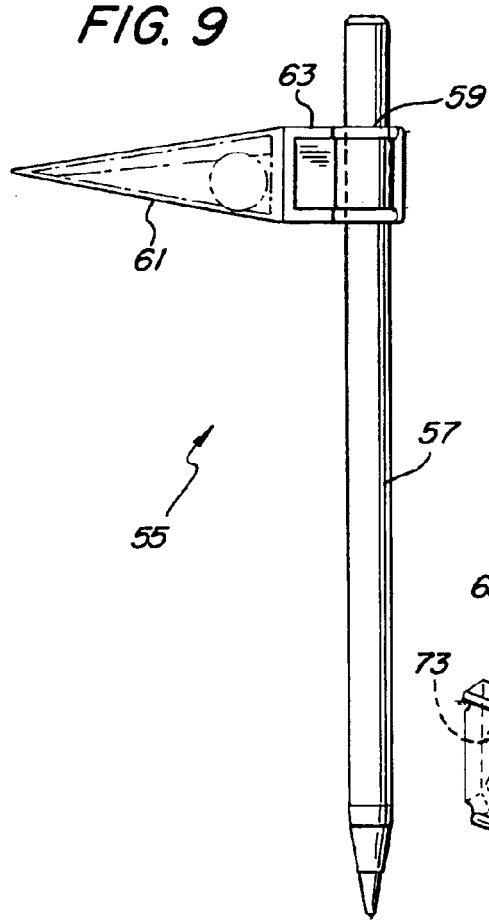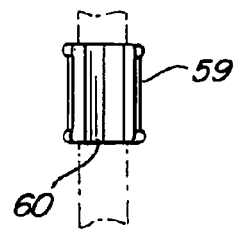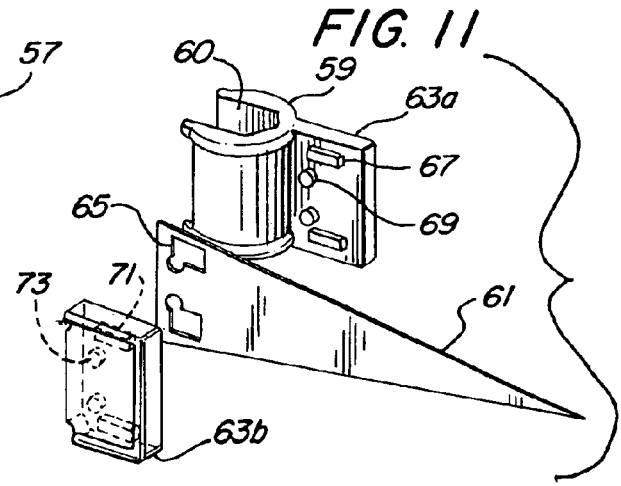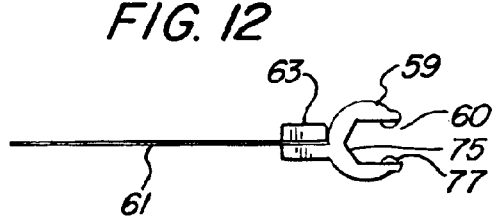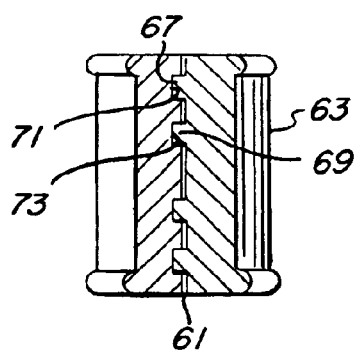

SHAFT MOUNTABLE PENNANT STRUCTURES

BACKGROUND OF THE INVENTION

1. Field of the Invention

The present invention relates generally to improvements in pennant mounting structures and more specifically pertains to new and improved pennant holders which are adapted for mounting on a variety of small poles.

2. Description of the Prior Art

In the field of pennant mounting structures for the display of affinity pennants, it has been a practice to employ pennants that are permanently attached to a shaft or flagpole. To the extent some mounting structures may be removable from the shaft, such mounting structures are designed for a particular type of flagpole. These devices have been unsatisfactory because the mounting structures have been inflexible in terms of where they could be mounted, such as on automobile antennas or other small poles such as pencils, for example.

SUMMARY OF THE INVENTION

The present invention overcomes these shortcomings by providing a pole holder in the shape of a cylinder having a closed end, with the closed end being slit to form flaps that permit the pole to pass through the closed end and be grasped by the flaps. The pole holder has an integral receiving clip which is adapted to receive a pennant attachment made of two mating halves that grasp the pennant between them. In an alternate embodiment, the pole holder in the shape of a cylinder has both ends open and a slit along the length of the cylinder. A pennant attachment is formed integral with the slit cylinder. The pennant attachment has two mating parts that interfit and grasp the pennant between the two halves.

BRIEF DESCRIPTION OF THE DRAWINGS

The objects and many of the attendant advantages of this invention will become readily apparent to those skilled in the art as the invention becomes better understood by reference to the following detailed description when considered in conjunction with the accompanying drawings in which like reference numerals designate like parts throughout the figures thereof and wherein:

FIG. 5 is an assembly drawing of the embodiment shown in FIG. 1.

FIG. 6 is a cross-section of the embodiment of FIG. 1.

FIG. 7 is a partial top plan view of one of the elements of the embodiment of FIG. 5.

FIG. 8 is a section taken along line 8—8 of FIG. 7 looking in the direction of the arrows.

FIG. 9 is a front plan view of a second embodiment.

FIG. 10 is a side plan view of the embodiment of FIG. 9 without the pole.

FIG. 11 is an assembly drawing showing the parts of the embodiment of FIG. 9.

FIG. 12 is a top plan view of the embodiment shown in FIG. 9, without the pole.

FIG. 13 is a partial cross-section of the embodiment of FIG. 9.

DETAILED DESCRIPTION OF THE PREFERRED EMBODIMENTS

Figure 1:
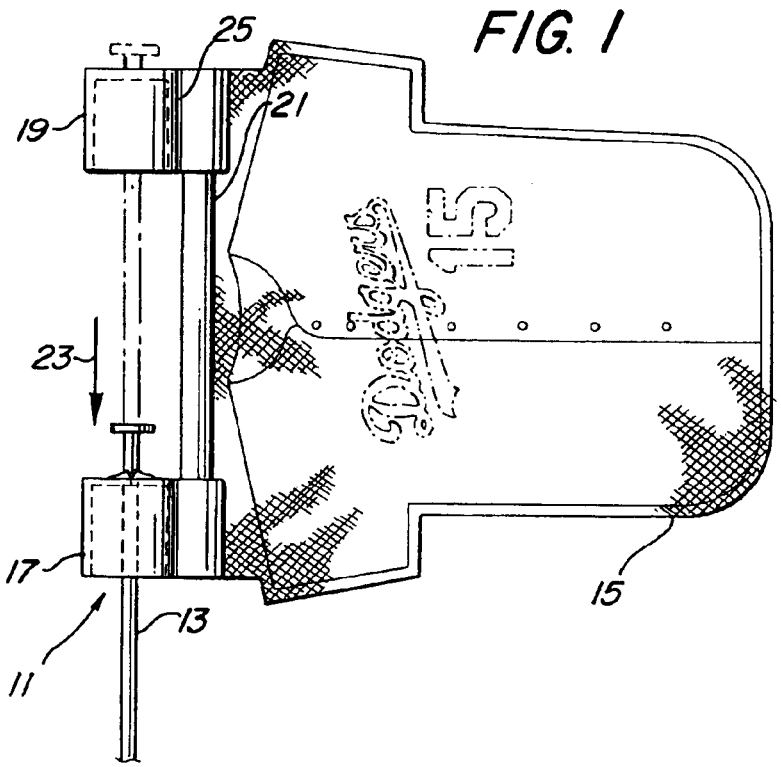
FIG. 1 is a front plan view of a preferred embodiment of the invention.
Figure 2:
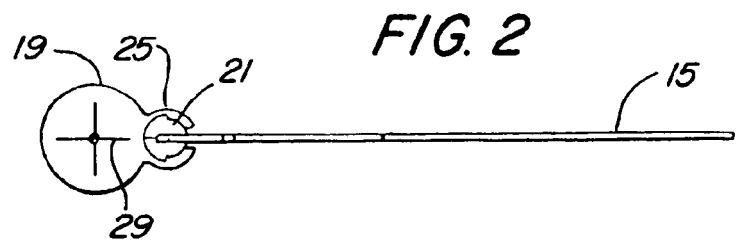
FIG. 2 is a top plan view of the embodiment shown in FIG. 1.
Figure 3:
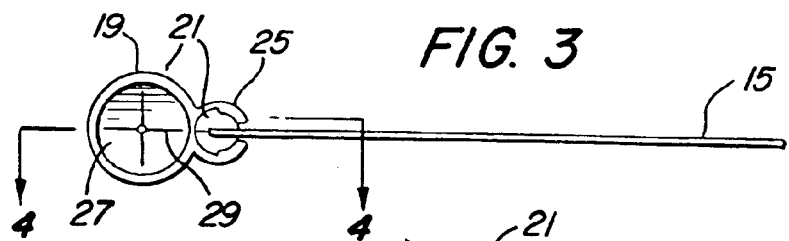
FIG. 3 is a bottom plan view of the embodiment shown in FIG. 1.

A preferred embodiment of a pennant holder 11 according to the present invention is shown in FIG. 1, holding a pennant 15 and attached to a small pole 13, which is preferably an automobile antenna. The pennant holder 11 is made of a plurality of parts. A pair of cylinders 17 and 19, shown in FIGS. 1–4, are made out of a flexible plastic material and function to hold the pole 13. A top end of the pole holder 19 has slits 29 for creating four flaps. Each pole holder 17 and 19 also has an integral receiving clip 25. Clip 25 receives a pennant attachment mechanism 21 which, as can be more clearly seen in FIG. 5, is made up of two mating parts 21a and 21b that come together to hold the pennant 15 along the entire length of the attachment end 46 of the pennant. The two halves 21a and 21b of the pennant attachment interlock by way of cleats 43 which pass through holes 45 in the attachment end of the pennant 15, and are received by the other half 21b of the pennant attachment mechanism. Once the pennant is firmly between the two halves 21a and 21b of the pennant attachment 21, it is inserted into the clips 25 of pole holders 19 and 17.

Although two separate pole holders 19 and 17 have been described for holding the pennant attachment mechanism 21 and attaching to the pole 13, it should be understood that one pole holder 19 longer in length than the pole holder shown in the drawings could be utilized. A single pole holder may also have both its top and bottom closed and slit to form flaps to grasp the antenna 13.

Figure 4:
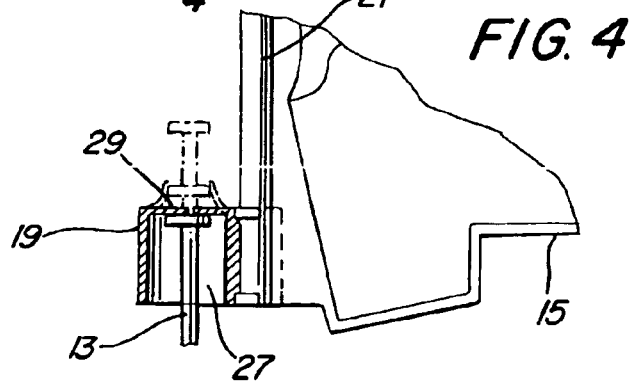
FIG. 4 is a partial plan view, partly in section, showing a portion of the structure of the embodiment of FIG. 1.

FIG. 4 illustrates how the antenna 13 is pushed through the pole holder cylinder 19 to displace the flaps 29 causing them to grab antenna 13 and hold the pennant 15 fast to the antenna 13.

The pennant 15 illustrated in the figures is shaped in the form of a baseball jersey with a team name and logo, and a player's name and number, for example. It should be understood that this type of affinity pennant can take many forms. In other words, many different kinds of sports jersey shapes may be used as the pennant, in addition to the traditional flag shape and triangular shape, which would also carry team logos, sponsors' logos and other affinity indicia, as desired.

The structure of the pole holders 17 and 19 of the preferred embodiment allow the pennant holder to be mounted on a variety of different diameter small poles because the flaps are self-adapting to varying diameters of poles that fit within the cylindrical space 27 of the pole holder 19.

The pennant holder of this preferred embodiment is specially adapted for withstanding the forces that are exerted on it as a result of being mounted on the antenna of a fast moving automobile. The two halves 21a and 21b of the pennant attachment 21 not only lock together by way of cleats 43 on half 21a fitting into slots 47 on half 21b of the pennant attachment, but it is preferred that a strong synthetic glue be applied between the two halves 21a and 21b after the pennant 15 is placed on the cleats 43 so that they pass through the apertures 45 in the attachment end 46 of the pennant. Once the two halves 21a and 21b are press fit and glued together, the pennant 15 is held firmly therebetween along the entire length 46 of the attachment, and the pennant attachment 21 then forms essentially a single structural unit.

Pennant attachment 21 has a unique shape at its ends, as a result of ridges 31 and 33 at one end and ridges 35 and 37 at the other end. These ridges fit into the receiving slots 39 of the receiving clips 25 (FIG. 7). Ridge 31, for example, would fit into receiving slot 39a at the top portion of receiving clip 25. Ridge 33 would fit into receiving slot 39b at the bottom portion of receiving clip 25.

The pennant attachment 21 is thus held structurally within receiving clips 25. However, in the extreme environment of an automobile antenna, it is desirable to glue the ends of the pennant attachment 21 into the receiving clips 25 for the two pole holders 19 and 17. Thus, as shown in FIG. 6, one end of the pennant attachment 21 with its ridges 31 and 33 is held fast within the slots 39 of pole holder 19 while the other end with ridges 35 and 37 are held fast within the slots 41 of pole holder 17.

Thus assembled, the pennant holder 11 is simply attached to the small pole 13, in this case, an automobile antenna, by pushing it down over the antenna in the direction 23 as shown in FIG. 1.

FIG. 9 illustrates an alternate embodiment of a pennant holder 55 designed for a less severe environment than that of an automobile antenna. FIG. 9 illustrates a pennant holder for attachment to a shaft 57 which may be a pencil, for example. The pennant holder 55 includes a pole holder 59 that attaches to the pencil 57 and a pennant attachment 63, which is integral with the pole holder 59, and is designed to hold the pennant 61.

The pole holder 59 has a slit 60 along its length which may have varying widths. The slit illustrated in FIG. 10, for example, is shown as relatively wide, for ease of attachment to a pencil having a hexagonal shape, for example. As can be seen more clearly in FIGS. 11 and 12, the interior surface 75 of pole holder 59 is shaped to conform to the hexagonal shape of a pencil.

The pennant 61 which is illustrated as a triangular flag is held by the pennant attachment 63 which has two parts 63a and 63b. The 63a half is formed integral with pole holder 59. It has a plurality of cleats 67 and 69 of different shapes that match and insert into recesses 71 and 73, respectively, in the mating half 63b of the pennant attachment 63. The pennant 61 has a plurality of apertures 65 that will allow the cleats 67 and 69 to pass there through. The pennant 61 may simply be held between the two halves 63a and 63b of the pennant attachment, as a result of the press fit between the cleats and apertures in the two halves. For a more robust structure, a synthetic glue should be applied.

An assembled structure is illustrated from the top in FIG. 12. In order to maintain a firm grip on the pencil 57, riser buttons 77 may be formed into the sides at the slit 60 of pole holder 59.

It should be recognized that the width of slit 60 may be reduced, thereby increasing the gripping force of the pole holder. In addition, the shape of the pennant 61 may be any shape, as discussed above, and is not confined to a triangular shape.

What is claimed is:

1. A pennant holder for attaching a pennant to a small pole, comprising:

a pole holder made out of a plastic material in the shape of a hollow cylinder having a closed end, the closed end being slit to form flaps that permit the pole to pass through the closed end of the cylinder while displacing the flaps and causing the flaps to grasp and hold the pole, the pole holder having an outwardly extending integral U-shaped clip; and an elongated pennant attachment having two mating halves adapted to grasp an attachment end of the pennant and hold it along the length of the attachment end, the pennant attachment being received within the U-shaped clip extending from pole holder.

2. The pennant holder of claim 1 wherein the pole holder closed end is slit to form four flaps.

3. The pennant holder of claim 1 wherein the pole holder cylinder is attached along its side to the receiving clip.

4. The pennant holder of claim 3 wherein the receiving clip interior surface is contoured to receive the pennant attachment mating parts which are holding the attachment end of the pennant.

5. The pennant holder of claim 1 wherein the pole holder comprises a pair of cylinders, each having a closed end slit to form flaps, the cylinders being attached to opposite ends of the pennant attachment, each cylinder having a receiving U-shaped clip.

6. The pennant holder of claim 5 wherein the closed ends of the pole holders are slit to form four flaps.

7. The pennant holder of claim 5 wherein the pole holder cylinders are each attached along a respective side to the receiving U-shaped clip.

8. The pennant holder of claim 5 wherein the receiving U-shaped clips each have an interior surface contoured to receive the pennant attachment mating parts while holding the attachment end of the pennant.

9. The pennant holder of claim 1 adapted to hold a pennant in the form of a rectangular flag.

10. The pennant holder of claim 1 adapted to hold a pennant in the form of a triangular flag.

11. The pennant holder of claim 1 adapted to hold a pennant in the form of a sports jersey.

12. The pennant holder of claim 11 wherein the sports jersey is a baseball jersey.

13. The pennant holder of claim 1 wherein the small pole is an automobile antenna.

* * * * *